(12) United States Patent
Joukovsky et al.

(10) Patent No.: US 10,521,412 B2
(45) Date of Patent: Dec. 31, 2019

(54) COMPLEX MULTI-LAYER TOKEN APPORTIONMENT STACK FOR TOKEN ASSIGNMENT WITHIN MULTIPLE-TIERED DATA STRUCTURES

(71) Applicant: Accenture Global Solutions Limited, Dublin (IE)

(72) Inventors: Anna Natasha Joukovsky, Belfast, ME (US); Siddhartha Pailla, Herndon, VA (US); Kiwan E. Bae, New York, NY (US); Tiffany B. DeVaughn, Atlanta, GA (US); Liza Maya David, Syosset, NY (US); Andrew Michael Walker, Jr., Great Falls, VA (US)

(73) Assignee: Accenture Global Solutions Limited, Dublin (IE)

( * ) Notice: Subject to any disclaimer, the term of this patent is extended or adjusted under 35 U.S.C. 154(b) by 554 days.

(21) Appl. No.: 15/406,235

(22) Filed: Jan. 13, 2017

(65) Prior Publication Data
US 2018/0203887 A1 Jul. 19, 2018

(51) Int. Cl.
*G06F 17/30* (2006.01)
*G06N 99/00* (2019.01)
(Continued)

(52) U.S. Cl.
CPC ...... *G06F 16/2246* (2019.01); *G06F 16/2455* (2019.01)

(58) Field of Classification Search
CPC ............. G06F 16/2246; G06F 16/2455; G06F 16/245; G06F 17/30327; G06F 17/30477; G06N 5/04; G06N 99/005
See application file for complete search history.

(56) References Cited

U.S. PATENT DOCUMENTS 5,761,664 A * 6/1998 Sayah .................. G06F 17/5068
5,920,703 A * 7/1999 Campbell ............... H04L 29/06
709/236
(Continued)

FOREIGN PATENT DOCUMENTS

AU 2017258953 B1 * 6/2018 ........... G06F 16/245

OTHER PUBLICATIONS

Anna Natasha Joukovsky, Siddhartha Pailla, Kiwan E. Bae, Tiffany B. DeVaughn, Liza Maya David, and Andrew Michael Walker; "Product Costing Assignment—User Manual" dated Sep. 2016, pp. 1-20.

*Primary Examiner* — Kostas J Katsikis
(74) *Attorney, Agent, or Firm* — Brinks Gilson & Lione

(57) ABSTRACT

A token apportionment stack may include multiple layers. A data structure layer of the token apportionment stack may access configuration memory to determine nodes and node attributes for a multiple-tier data structure. The data structure layer may send a message to a token assignment later of the token apportionment stack that indicates the determined nodes and attributes. Responsive to the message, the token assignment layer may assign tokens to a first node and recursively assign an apportionment of the assigned tokens to a second node. The token assignment layer may send a message with the assignments to the data structure layer. An interface interaction layer of the token apportionment stack may receive and handle query regarding token assignment by accessing token assignment data stored at the data structure layer.

20 Claims, 5 Drawing Sheets

(51) Int. Cl.
*G06N 5/04* (2006.01)
*G06F 16/22* (2019.01)
*G06F 16/2455* (2019.01)

(56) References Cited

U.S. PATENT DOCUMENTS

| | | | | |
|---|---|---|---|---|
| 8,527,942 B2* | 9/2013 | Foti | ............................ | G06F 8/42 |
| | | | | 717/106 |
| 8,762,951 B1* | 6/2014 | Kosche | ............... | G06F 11/3476 |
| | | | | 717/127 |
| 9,886,725 B1* | 2/2018 | Bober | ................... | G06Q 40/123 |
| 2005/0183058 A1* | 8/2005 | Meijer | ................... | G06F 9/4484 |
| | | | | 717/100 |
| 2005/0289510 A1* | 12/2005 | Illowsky | ............... | G06F 1/3203 |
| | | | | 717/107 |
| 2006/0070030 A1* | 3/2006 | Laborczfalvi | ............. | G06F 8/61 |
| | | | | 717/120 |
| 2006/0206866 A1* | 9/2006 | Eldrige | ................... | G05B 15/02 |
| | | | | 717/122 |
| 2007/0006125 A1* | 1/2007 | Gutberlet | ............ | G06F 17/5045 |
| | | | | 717/101 |
| 2007/0043531 A1* | 2/2007 | Kosche | ............... | G06F 11/3447 |
| | | | | 702/182 |
| 2008/0109796 A1* | 5/2008 | Kosche | ............... | G06F 11/3612 |
| | | | | 717/158 |
| 2008/0114806 A1* | 5/2008 | Kosche | ............... | G06F 11/3409 |
| 2008/0127107 A1* | 5/2008 | Kosche | ............... | G06F 11/3447 |
| | | | | 717/128 |
| 2008/0127116 A1* | 5/2008 | Kosche | ................. | G06F 11/328 |
| | | | | 717/130 |
| 2008/0127120 A1* | 5/2008 | Kosche | ............... | G06F 11/3447 |
| | | | | 717/131 |
| 2008/0127149 A1* | 5/2008 | Kosche | ................... | G06F 8/443 |
| | | | | 717/158 |
| 2008/0177756 A1* | 7/2008 | Kosche | ............... | G06F 11/3447 |
| 2013/0325903 A1* | 12/2013 | Rohlf | ..................... | G06T 17/05 |
| | | | | 707/797 |
| 2015/0248525 A1* | 9/2015 | Ury | ........................ | G06Q 50/24 |
| | | | | 705/3 |
| 2017/0091243 A1* | 3/2017 | Cheru | ................... | G06F 16/217 |
| 2017/0316041 A1* | 11/2017 | Delaney | ............ | G06F 16/2246 |
| 2017/0364487 A1* | 12/2017 | Nalchadzhi | ......... | G06F 17/2241 |
| 2018/0006897 A1* | 1/2018 | Kanza | ................... | H04L 41/145 |
| 2018/0089245 A1* | 3/2018 | Warren, Jr. | ............ | G06F 16/2246 |
| 2018/0203887 A1* | 7/2018 | Joukovsky | ............ | G06F 16/245 |

* cited by examiner

US 10,521,412 B2

COMPLEX MULTI-LAYER TOKEN APPORTIONMENT STACK FOR TOKEN ASSIGNMENT WITHIN MULTIPLE-TIERED DATA STRUCTURES

TECHNICAL FIELD

This disclosure relates to token assignment within data structures.

BACKGROUND

Rapid advances in communications and resource distribution, driven by large scale network traffic management and industrial installations, have resulted in widespread adoption of networked resource distribution systems. As just one example, network switches may manage traffic allocations for backbone network systems handling many petabytes of traffic daily. Improvements in resource distribution management will further enhance the capabilities of communication and resource distribution systems.

DETAILED DESCRIPTION

In various systems tokens may be distributed among nodes within a multi-tiered data structure by a stack implemented on data processing circuitry. In various practical deployments, the tokens may be used to model resource distribution among entities represented by the nodes. In an example scenario, the nodes may represent regions and sub-regions within a managed territory. In the example scenario, the tokens may represent drone coverage of for the regions. As discussed below, the drone coverage for each of the sub-regions may be held consistent with the drone coverage for each of the regions through operation on the multi-tiered data structure. Other scenarios may include utility grid operation management, product costing models (PCM), and network bandwidth allotment for network switches.

The tiers of the multi-tiered data structure may be populated with nodes and stored in a configuration memory that may be accessed by a data structure layer of a token apportionment stack. Tokens may be apportioned to nodes within one tier and the token assignment layer of the stack may hold the apportionment of tokens to nodes in other tiers consistent. For example, tokens present in a tier may be amortized over nodes in other tiers by the token assignment layer.

Figure 1:
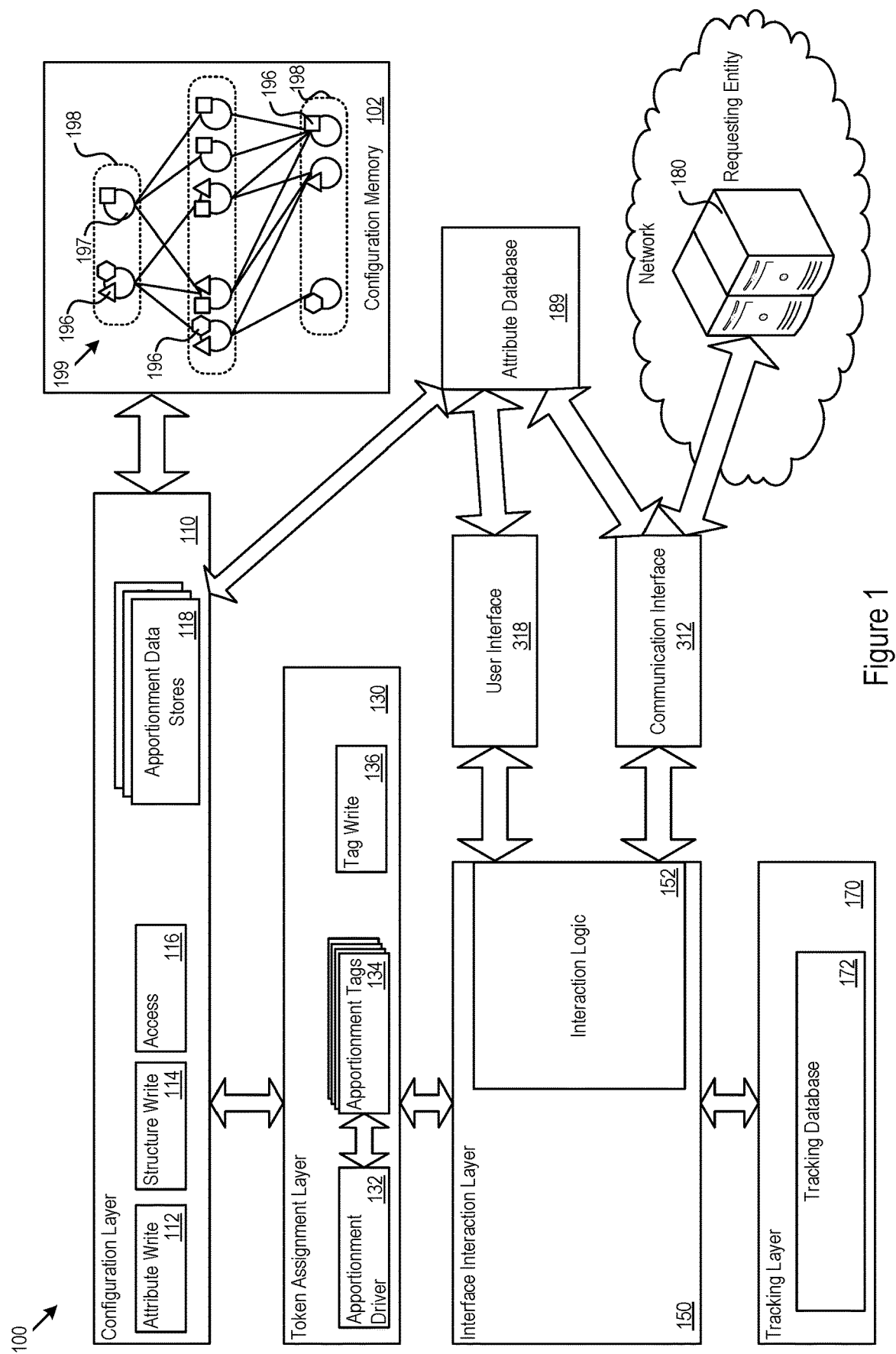
FIG. 1 shows an example system for implementing a token apportionment stack.
Figure 2:
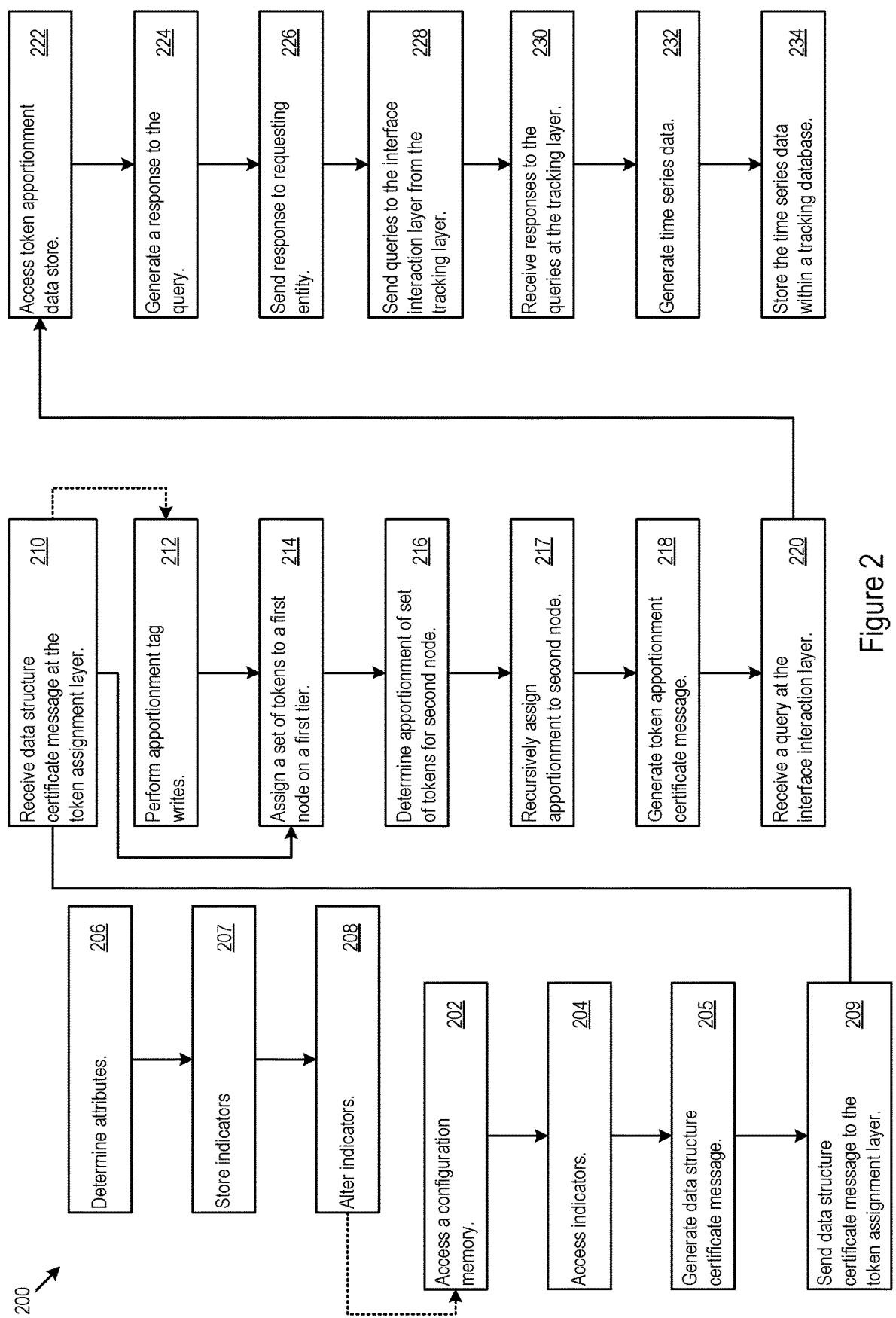
FIG. 2 shows example complementary end-to-end token apportionment and response handling logic (ETARL).

FIG. 1 shows an example token apportionment stack 100, and FIG. 2 shows example complementary end-to-end token apportionment and response handling logic (ETARL) 200. The token apportionment stack may include a configuration layer 110, a token assignment layer 130, an interface interaction layer 150, and a tracking layer 170.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the token apportionment stack 100, the data structure layer 110 may provide the interface interaction layer 150 with access to stored token apportionment data within a token apportionment data store. Hence, the data structure layer 110 may provide a hardware resource, e.g., data store memory access, to the interface interaction layer 150.

In various implementations the token apportionment stack 100 and complementary ETARL 200 may improve the functioning of the underlying hardware. For example, the token apportionment stack 100 may provide a platform by which resource apportionments may be assigned and tracked. Accordingly, computational architectures and hardware resources may more efficiently compute such resource assignments because the computational tasks involved are, by operation of the stack, threaded into discrete tasks, such as, division operations and inter-layer messaging, rather than handling the computations as comparatively complex multivariate optimizations that may occupy more hardware resources.

Referring again to FIGS. 1 and 2, the data structure 110 layer may include attribute write function 112, structure write function 114, and an access function 116. The data structure layer 110 may apply the functions 112, 114, 116 to perform computational operations on the configuration memory 102, which may store the structural layout of multiple-tier data structure 199 and indicators 196 of attributes for the individual nodes 197 of the tiers 198. The configuration memory 102 may be linked, either via physical data communication for separate memory stores or logically for physically-unified data stores, to a token apportionment data store 118 disposed on the data structure layer 110. In various implementations, parallel token apportionment data stores 118 may be disposed on the data structure layer to handle multi-dimensional token assignment across one or more data structures 199. Multi-dimensional token assignment may allow for apportionment of independent or semi-independent resources (or other modeled variables) across a data structure.

The data structure layer 110 may access the configuration memory 102 to determine nodes 197 disposed on the tiers 198 of the multiple-tier data structure 199 (202). The data structure layer 110 may access the indicators 196 on the configuration memory to determine one or more attributes for the nodes within the data structure 199 (204). Once the nodes and attributes are determined, the data structure layer 110 may generate a data structure certificate message specifying determined nodes and attributes (205). For example, the data structure certificate message may include field for the nodes that designate attributes and positional data for the nodes. In some cases, the certificate message may include integrity verification certificates, such as cyclic redundancy checks (CRCs), message headers, hashes, checksums or other integrity verification certificates, e.g., to allow detection of message corruption or unauthorized manipulation. In various implementations, the layers of the token apportionment stack 100 may be distributed over a cloud system or other distributed computing environment. In some cases, use of certificate messages may allow maintenance of a logically-sealed, e.g., against inadvertent message corruption or malicious attacks, system despite physical or geographic separation of system components.

The data structure layer 110 may also manage the association of attributes with nodes. The data structure layer 110 may access an attribute database 189 to determine attributes for nodes (206). The attribute database may be stored on a configuration server, provided by an operator of the token apportionment stack 100, or otherwise made available to the data structure layer 110. Response to the determined attributes, the data structure layer 110 may store indicators associating the attributes to the nodes within the configuration memory (207). The data structure layer 110 may also alter or delete (208) the indicators to disassociate an attribute with a node or change an attribute associated with a node.

In various implementations, the data structure may have any finite number of tiers. The number of tiers may be selected based on a dynamic range of the distribution modeled by the multiple-tier data structure and the granularity of the tiers. Increasing, e.g., through data structure layer write operations, the dynamic range while holding the granularity constant may increase the number of tiers within a multiple-tier data structure. Similarly, increasing the granularity while holding the dynamic range constant may increase the number of tiers within a multiple-tier data structure. In other systems, such as PCMs, the number of nodes and tiers in a data structure may be determined by the manufacturing inputs and components of the product or group of products for which the PCM is being applied.

The data structure layer 110 may send the data structure certificate message to the token assignment layer 130 (209). The token assignment layer 130 may receive the data structure certificate message (210). Responsive to the nodes and attributes designated within the data structure certificate message, the token assignment layer 130 may assign a set of tokens to a first node at a first tier within the multiple-tier data structure 199 (214).

In response to the assignment of the set of tokens to the first node, the token assignment layer 130 may access an apportionment driver 132 within the token assignment layer 130 to determine an apportionment of the set of tokens for a second node in a second tier below the first tier (216). In some cases, the apportionment driver may include apportionment tags 134. The apportionment tags 134 may be generated by the token assignment layer 130 responsive to attributes assigned to the nodes 197. Nodes with related attributes on neighboring tiers may be associated via an apportionment tag 134 within the apportionment driver 132 at the token assignment layer 130. Once associated by an apportionment tag 134, tokens as a set to one node may be apportioned to other nodes associated to that node by an apportionment tag.

The magnitude of the association represented by an apportionment tag 134 may be determined by a level of relationship between the attributes of the two nodes. Nodes with stronger correlations between their attributes may have a higher magnitude of association codified within their apportionment tags. In some cases, a set of tokens for a given node may be amortized, either partially or completely, over the group of nodes in another tier for which they share an apportionment tag with that given node. The relative portions of the set of token assigned to the nodes in the group may be determined based on the magnitudes of the associations codified in their corresponding apportionment tags. Thus, the apportionments to the nodes on a first tier with apportionment tag associations with a particular node on another tier, e.g., the neighboring tier above the first tier, may completely account for a set of tokens assigned to the particular node. However, in some cases, neighboring tiers may not necessarily completely account for a set of tokens assigned to a particular node. For example, tokens may be lost for the purposes of efficiency accounting, redundancy, tolerance threshold maintenance, tier skipping, or other purposes. Further, the token assignment layer 130 may forgo assignment of an apportionment of tokens from the set of token from the particular node to any node on the first tier lacking an apportionment tag associated with the particular node.

Apportionment tag associations may be direct, such as, set-subset relationships. For example, an attribute associated with a first node on a first tier may include an indicator for a local demand magnitude for a particular resource. An attribute associated with a second node on a second tier may simply represent a portion of that local demand magnitude. Accordingly, the strength of the relationship would be proportional to the portion. Tag associations may be indirect, such as, vector relationships that may have bearing on multiple parallel token distribution schemes. Accordingly, in such indirect systems, a correlation or other partial assessment of association strength may be used to determine overlap of attributes between nodes. Other systems may not necessarily support mathematical relationships between attributes. Rather qualitative assessments may be used to determine relationship strength. These qualitative assessments may be supplied by operator, machine learning algorithms (such as those provided by Google and Amazon Web Services), or other intuitive systems.

In some cases, machine learning techniques, such as Random Tree or Random Forest, may be used to predict future token distributions based on past distributions. Prediction based on machine learning techniques may be used to generate a predictive model of a policy (e.g., a resource distribution policy, a component inclusion/exclusion policy, or other policy) change prior to implementation of the policy change. For example, a future year's resource consumption level may be modeled by extrapolating previous behavior, e.g., modeled by the ETARL 200. Then, the extrapolation may be used a baseline model for continuing current policy. When a new policy is introduced, the observed outcomes may be compared to the baseline, e.g., by the ETRAL 200. The difference between the observed outcomes and the modelled baseline may serve as an estimate of the effect of the policy change.

Additionally or alternatively, the ETARL 200 may implement modelling, such as log-linear regression modelling, or other regression modelling, to determine factors contributing to an observed past output. The models produced may be used to determine how policies may be used to constrain or unconstrain a particular system or variable within a system to produce target outcomes (or otherwise desired outcomes).

The token assignment layer 130 may include an apportionment tag write function 136. In some cases, the token assignment layer 130 may perform apportionment tag writes based on attribute indications received from the data structure layer 110 (212). The apportionment tag writes may be used to edit, add, or remove apportionment tags 134. In various implementations, the token assignment layer 130 may use apportionment tag writes to alter apportionment tags when the attributes for nodes are changed and a corresponding indicator is received from the data structure layer 110. In some cases, when an apportionment tag write removes an apportionment tag the drove assignment of one or more tokens to a node, the token assignment layer 130 may revoke assignment of the tokens to that node.

The token assignment layer 130 may recursively assign tokens to nodes based on the determined apportionments (217). In various implementations, recursive assignment may include reconciling an assignment of tokens with assignment of tokens in another tier of the multiple-tiered data structure. For example, when a set of tokens assigned to a node in the first layer is apportioned among nodes in a second layer. The token assignment layer may perform a check to ensure that the complete set is accounted for in the second tier. If the complete set is not accounted for, the token assignment layer 130 may adjust apportionments of individual nodes within the second tier until the complete set is accounted for. Recursive assignment may ensure consistency of token assignment among the various tiers of a multiple-tier data structure. Accordingly, recursive assignment may prevent inadvertent loss of tokens between assignment processes on different tiers.

In some case, recursive assignment may operate by assigning tokens to nodes on a lower tier and then aggregating the lower tier assignments into an assignment of a set of tokens to a node on a higher tier. Accordingly, recursive assignment may operate forward, e.g., proceeding from higher tiers to lower tiers, or in reverse, e.g., proceeding from lower tiers to higher tiers.

Once the apportionments are assigned to one or more nodes, the token assignment layer 130 may generate a token apportionment certificate message (218). The token apportionment certificate message may be a certificate message that includes indications of token apportionments for various nodes. In some cases, the system may send individual messages for individual nodes. For example, individual node messages may have smaller payload sizes, which may reduce peak network resource consumption. However, batch reporting messages for multiple nodes may also be used. For example, batch reporting may facilitate burst data transfers.

Once the token apportionment certificate message is generated by the token assignment layer, the token assignment layer may pass the token apportionment certificate message to a token apportionment data store 118 within the data structure layer 110. The token apportionment data store 118 may store token apportionments for the nodes in the data structure.

In some implementations, the interface interaction layer 150 may include interaction logic 152 coupled to various interfaces, such as user interface 318 and communication interfaces 312 discussed with respect to FIG. 3 below. The interface interaction layer 150 may receive, via the interaction logic 152, a query regarding a token apportionment for one or more nodes (220). For example, the interface interaction layer 150 may receive, from a user interface, a request to generate a display based apportionments for one or more nodes. Additionally or alternatively, the interface interaction layer 150 may receive a request over a communication interface from a network connected device or server.

The interface interaction layer 150 may access the token apportionment data store 118 to determined apportionments of tokens for the nodes referenced in the request (222). Responsive to accessing the token apportionment data store 118, the interface interaction layer 150 may generate a response to the query (224). The response may include token apportionment data for the nodes references in the query. In some cases, the response may include other information regarding the multiple-tiered data structure. For example, the other information may include structural data for interpreting the token apportionment data. In various implementations, the query, response, or both may comprise certificate messages. For example, the query, response, or both may include integrity verification certificates. The interface interaction layer 150 may send the response, via the interaction logic 152, to the requesting entity 180 that sent the query (226).

In various implementations that include a tracking layer 170, the tracking layer 170 may send queries to the interface interaction layer (228). For example, the tracking layer may send the queries to effect monitoring over time for token apportionment within the multiple-tiered data structure 199. The tracking layer 170 may include a tracking database 172. The tracking layer 170 may receive responses to the queries (230). Based on the responses, the tracking layer 170 may generate time series data for apportionment within the multiple-tiered data structure 199 (232). The tracking layer 170 may store the time series data within the tracking database 172, e.g., by updating time series database entries (234).

Figure 3:
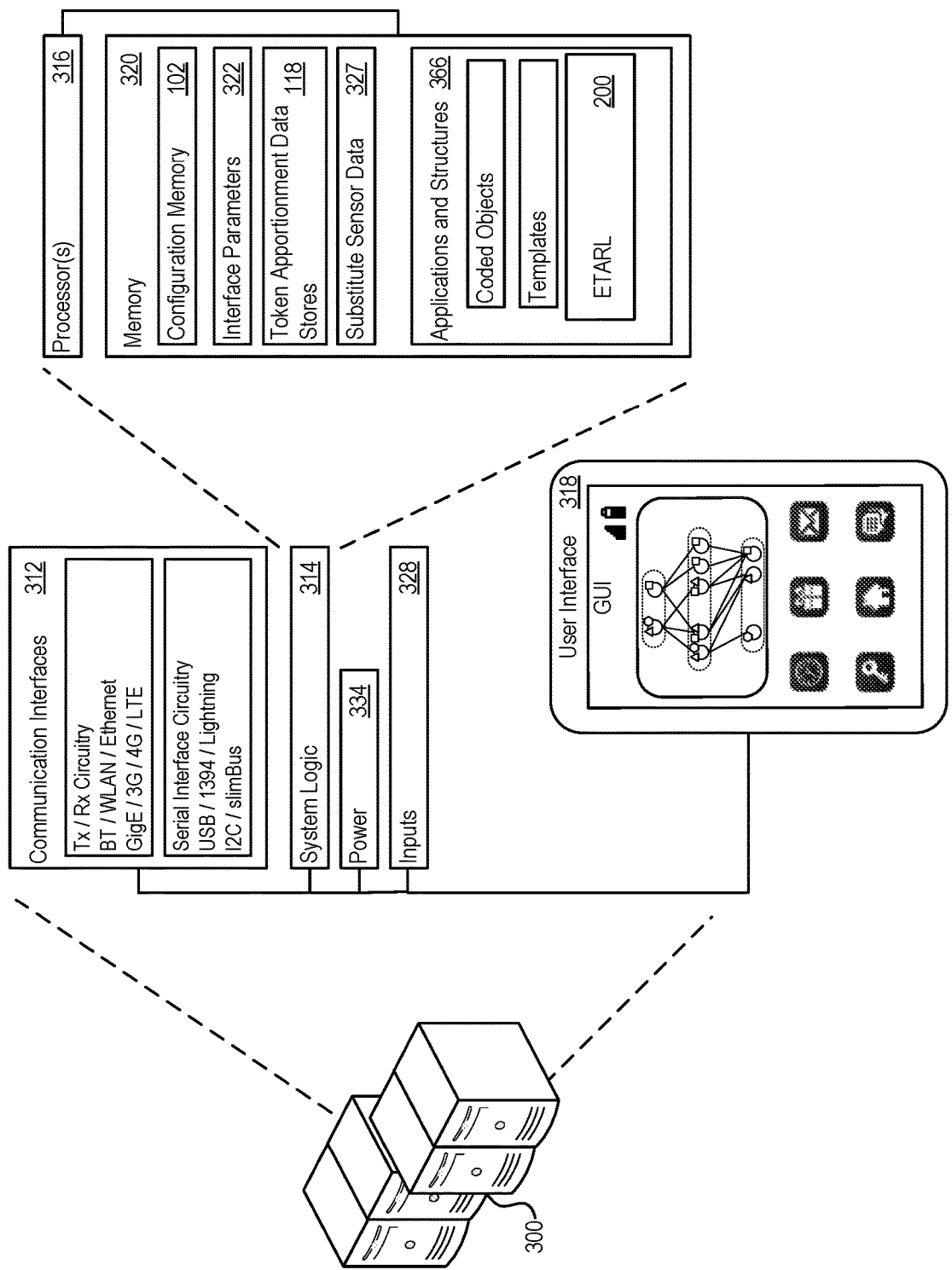
FIG. 3 shows an example specific execution environment for the token apportionment stack.

FIG. 3 shows an example specific execution environment 300 for the token apportionment stack 100 described above. The execution environment 300 may include system logic 314 to support execution of the multiple layers of the token apportionment stack 100 described above. The system logic may include processors 316, memory 320, and/or other circuitry.

The memory 320 may be include configuration memory 102, apportionment tags 134, communication interface parameters 322, and token apportionment data stores 118 as described above. In some cases, the memory 320, for example, memory used for the token apportionment data stores 118, may be implemented using a relational database management system (RDMS). The memory 320 may further include applications and structures 366, for example, coded objects, templates, or other structures to support attribute association, token assignment, multiple-tier data structure management, or other token apportionment tasks. The applications and structures may include the ETARL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, $I^2C$, slimBus, or other serial interfaces. The execution environment 300 may include power functions 334 and various input interfaces 328. The execution environment may also include a user interface 318 that may include human-to-machine interface devices and/or graphical user interfaces (GUI). In various implementations, the system logic 314 may be distributed over multiple physical servers and/or be implemented as a virtual machine.

In some cases the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the token apportionment stack 100, of the execution environment onto the hardware resources. In some cases, a manifest may be stored as a preference file such as a YAML (yet another mark-up language), .JSON, or other preference file type.

The methods, devices, processing, circuitry, and logic described herein may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The token apportionment stack 100 and multiple-tiered data structure 199 may be used to model various systems where resources or other monitored quantities may be tracked for consistency among multiple stages or regions within the model.

In an example scenario, the multiple-tiered data structure 199 may be implemented in modeling drone coverage for a delivery or surveillance system. The nodes may be used to represent regions of coverage with the different tiers demarcating successive levels of territorial granularity. Thus, drones assigned, e.g., by assigning a set of tokens, to a region represented by a node on a first tier may be divided up among the sub-regions, represented by nodes on a second tier below the first tier, making up the region. Accordingly, the number of drones assigned to the region may be equal to the number of drones assigned to its sub-regions. The assignment of drones to either tier may be recursive.

The attributes assigned to the nodes representing the regions include characteristics, such as, transient delivery demand, population, demographic information, surveillance target concentrations, or other characteristics that may be used to determine a number of drones that may be assigned to a particular area.

Once, tokens, e.g., those representing drones, are assigned to a node, the system may generate a flight plan, e.g., using mapping or logistics data, that directs the drone to the assigned region.

Although the example scenario discusses assigning drones to regions, other types of assignments may be effected using the token apportionment stack 100, for example, regional sales or service personnel assignments, patrol coverage, mass transit deployment, or other regional assignments.

In another example scenario, system throughput may be modelled. For example, the nodes may represent a hierarchical network switch system where throughput at lower tier network switches (e.g., local switches) is supported by throughput at higher tier network switches (e.g., backbone switches). The tokens may represent throughput quanta and may be kept consistent across the tiers. The recursive assignment of tokens may prevent bottlenecks and congestion where a given tier lacks the throughput to support activity at another tier by promoting continuity in bandwidth assignment across tiers. Similarly, other systems, depending on throughput, may be modelled, such as, electricity delivery through hierarchical switching stations within an electrical grid, or water delivery through hierarchical water mains within a metered district.

In another scenario, the token apportionment stack 100 and multiple-tiered data structure 199 may be used to implement a PCM. Within the PCM, the multiple-tiered data structure 199 to track how a cost (such as a pecuniary cost, resource cost, or other cost) may be amortized over multiple products of components within a product or service. Additionally or alternatively, PCM implementations of the token apportionment stack 100 and multiple-tiered data structure 199 may be used to determine component contributions to an overall product or service cost.

Figure 4:
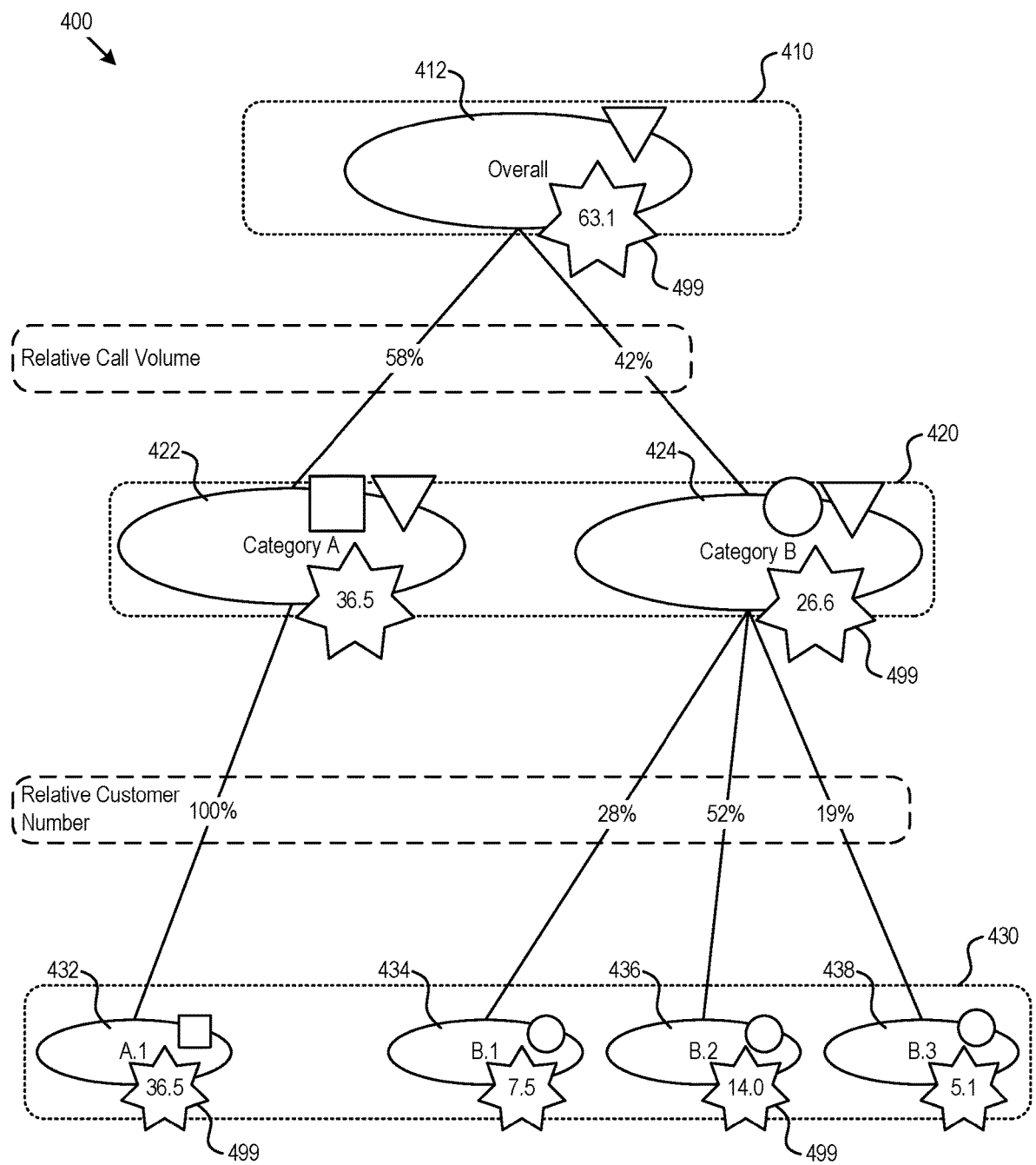
FIG. 4 shows an example implementation of the token apportionment stack and multiple-tiered data structure.

FIG. 4 shows an example telephony PCM implementation 400 of the token apportionment stack and multiple-tiered data structure that may be used to determine the distribution of costs of provision among multiple telephony service offerings. In the example, the telephony PCM implementation 400 includes three tiers 410, 420, 430. The top level tier includes one node 412 representing overall expenditures for all calls in the example. The expenditures are presented by 63.1 tokens 499. The mid-level tier includes two nodes for two product category offerings A 422, B 424. The bottom level tier includes product offerings divided into four nodes: A.1 432, B.1 434, B.2 436, and B.3 438. The apportionment tagging between the top and mid-tiers is driven by call volume for the product categories A 422, B 424. The apportionment tagging between the top and mid-tiers is driven by customer numbers for each of the for the product offerings. Since the product A.1 is not within the B product category no portion of the B service cost (e.g., tokens 499) is apportioned to A.1. Since A.1 is the sole A product category offering 100% of the A service cost is apportioned to A. The costs to the B category service offering are distributed in portion to their relative number of customers. In the implementation 400, the recursive assignment of tokens 499 to each tier holds the total number of tokens assigned to each tier constant.

In another example, PCM implementations may be applied to track vehicle emission contributions from components within an automobile. In the system, the total emissions from the operation of engine may be distributed among the nodes. Each node demarcates an engine output consumer (e.g., a component that consumes some portion of the energy generated through operation of the engine). The nodes may have local contributions, e.g., the portion of the engine output (e.g., energy) consumed in the operation of that node. Also nodes may have engine output assigned from systems on which the node depends.

For example, the radio may rely on the in-dash display of the automobile for operation. Similarly, the environmental control system may rely on the in-dash display. Accordingly, the engine output (e.g., energy) consumed by the in-dash display may be apportioned among the radio and environmental control system. Above the node for the in-dash display may be a node representing an alternator used by radio, environmental control system, and the in-dash display, and other electrical systems. The contribution from the alternator would be distributed to the in-dash display and immediately to the radio and environmental control system. The portion distributed to the in-dash display from the alternator would then be re-apportioned in part to the radio and environmental control system albeit through an extra step. The emissions attributable to a given node would be proportionate to the energy that node consumes and the energy consumption of nodes on which it depends. For real-time monitoring schemes, the cost of particular system can be adjusted as other systems are turned on and off. For example, if the radio is turned off in the example, the tokens (energy quanta) attributable from the in-dash display to the environmental control system would increase since there are fewer active systems over which to amortize the energy consumption of the in-dash display.

Similar analysis may be applied when determined a pecuniary cost for an automobile or other multi-component product or service.

Figure 5:
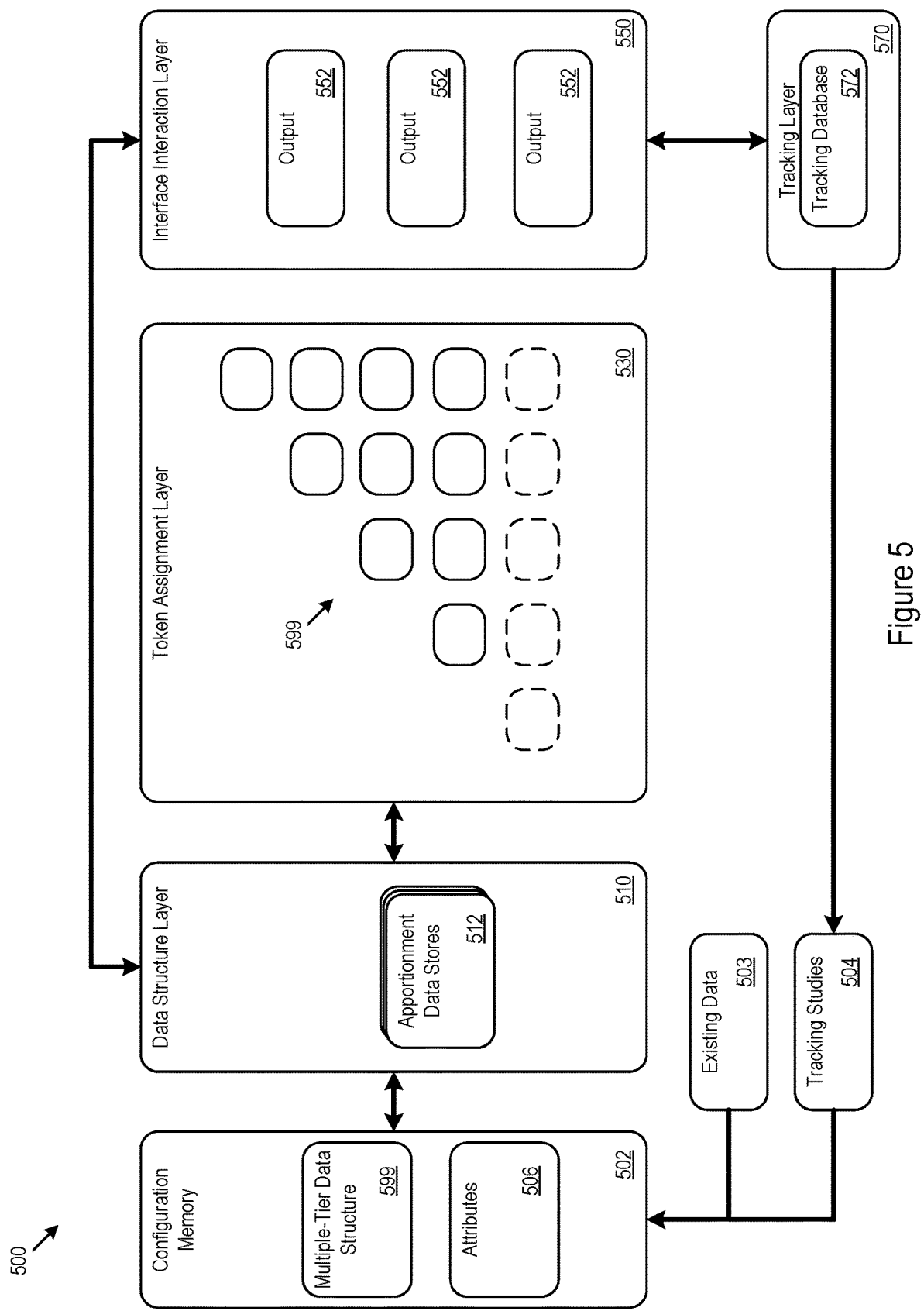
FIG. 5 shows an example instance of the ETARL.

FIG. 5 shows an example instance 500 of the ETARL 200. In the example instance 500, the configuration memory 502 may store input data such as the overall structure of the multiple-tier data structure 599, and attribute information 506. The input data may be determined from existing data 503 and tracking studies 504. The configuration memory 502 may be accessed by the data structure layer 510. The attributes and structure information may be passed, e.g., via certificate message to the token assignment layer 530. The token assignment layer 530 may operate on the multiple-tier data structure 599. After token assignments are completed by the token assignment layer and passed to the token apportionment data stores 512, the interface interaction layer 550 may generate outputs 552 to systems requesting token data. The interface interaction layer 550 may also send output 552 to the tracking layer 570, which may store time series data within a tracking database 572.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
  accessing, from configuration memory, a multiple-tier data structure at a data structure layer of a token apportionment stack to determine:
    a first node within a first tier of the multiple-tier data structure;
    a second node on a second tier of the multiple-tier data structure,
      the second tier different than the first tier; and
    a first attribute that characterizes the first node;
  at a token assignment layer of the token apportionment stack:
    receiving, from the data structure layer, a data structure certificate message,
      the data structure certificate message specifying the first node and the first attribute;
    assigning a set of tokens to the first node responsive to the first attribute;
    accessing an apportionment driver to determine an apportionment of the set of tokens for the second node;
    recursively assigning the apportionment of the set of tokens to the second node;
    passing a token apportionment certificate message to a token apportionment data store in the data structure layer, the token apportionment certificate message comprising an indicator of the apportionment of the set of tokens assigned to the second node;
  at an interface interaction layer of the token apportionment stack:
    receiving a query regarding apportionment of the set of tokens for the second node;
    responsive to the query, accessing the token apportionment data store in the data structure layer; and
    generating a response to the query based on the apportionment of the set of tokens to the second node.

2. The method of claim 1, where recursively assigning the apportionment of the set of tokens to the second node comprises amortizing the set of tokens completely over nodes within the second tier.

3. The method of claim 1, where recursively assigning the apportionment of the set of tokens to the second node comprises:
  determining that the set of tokens does not completely account for the tokens related to the attribute assigned to nodes on the second tier; and
  increasing a number of tokens in the set of tokens assigned to the first node to completely account for the tokens related to the attribute assigned to nodes on the second tier.

4. The method of claim 1, further comprising:
  accessing, at the data structure layer, an attribute database to determine the first attribute for the first node;
  storing an indicator of the first attribute within the configuration memory; and
  performing a first data structure rewrite to associate the first node with the indicator of the first attribute.

5. The method of claim 4, further comprising:
  receiving, at the data structure layer, an attribute alteration message from the interface interaction layer; and
  responsive to the attribute alteration message, performing a second data structure rewrite to disassociate the first node with the indicator of the first attribute.

6. The method of claim 5, further comprising:
  responsive to disassociating the first node with the indicator of the first attribute;
  receiving, at the token assignment layer, another data structure certificate message specifying disassociation of the first node with the first attribute;
  revoking assignment of the set of tokens to the first node; and
  recursively revoking assignment of the apportionment of the set of tokens for the second node, the recursively revoking assignment responsive to revoking assignment of the set of tokens to the first node.

7. The method of claim 1, further comprising:
receiving the response to the query at a tracking layer of the token apportionment stack; and
updating a time series database entry to reflect the response to the query.

8. The method of claim 1, further comprising:
accessing the configuration memory to determine a second attribute for the second node; and
passing an indicator of the second attribute to the apportionment driver to alter a first apportionment tag for the second node.

9. The method of claim 8, linking the first node to the second node via the first apportionment tag.

10. The method of claim 8, where recursively assigning the apportionment of the set of tokens to the second node comprises amortizing the set of tokens completely over nodes within the second tier linked to the first node via an apportionment tag.

11. The method of claim 8, further comprising forgoing assignment of another apportionment of the set tokens to a third node within the second tier when the third node lacks an apportionment tag linking the third node to the first node.

12. The method of claim 1, further comprising, at the interface interaction layer:
determining that the apportionment of the set of tokens includes a token; and
generating a flight route for a drone to a region represented by the second node, the drone represented by the token.

13. The method of claim 1, further comprising, at the interface interaction layer:
determining that the apportionment of the set of tokens includes a token;
assigning a first bandwidth allotment to a first network switch represented by the second node, the first bandwidth allotment the first bandwidth allotment represented by the token; and
assigning a second bandwidth allotment to a second network switch represented by the first node, the second bandwidth allotment sized to service the first bandwidth allotment and represented by the set of tokens.

14. A device comprising:
a communication interface configured to:
 receive a query regarding apportionment of a set of tokens; and
 send a response to the query;
a processor coupled to the communication interface;
memory in data communication with the processor, the memory configured to store:
 a multiple-tier data structure;
 an apportionment driver;
 a token apportionment data store; and
 instructions configured to, when executed, cause the processor to:
  determine, at a data structure layer of a token apportionment stack executing on the processor:
   a first node within a first tier of the multiple-tier data structure;
   a second node on a second tier of the multiple-tier data structure, the second tier different than the first tier; and
   a first attribute that characterizes the first node;
  at a token assignment layer of the token apportionment stack:
   receive, from the data structure layer, a data structure certificate message specifying the first node and the first attribute;
   assign the set of tokens to the first node responsive to the first attribute;
   access the apportionment driver to determine an apportionment of the set of tokens for the second node;
   recursively assign the apportionment of the set of tokens to the second node;
   pass a token apportionment certificate message to the token apportionment data store, the token apportionment certificate message comprising an indicator of the apportionment of the set of tokens assigned to the second node;
  at an interface interaction layer of the token apportionment stack:
   cause the communication interface to receive the query;
   responsive to the query, accessing the token apportionment data store in the data structure layer; and
   generate the response to the query based on the apportionment of the set of tokens to the second node.

15. The device of claim 14, where the instructions are further configured to cause the processor to recursively assign the apportionment of the set of tokens to the second node by amortizing the set of tokens completely over nodes within the second tier.

16. The device of claim 14, where the instructions are further configured to cause the processor to recursively assign the apportionment of the set of tokens to the second node by:
determining that the set of tokens does not completely account for the tokens related to the attribute assigned to nodes on the second tier; and
increasing a number of tokens in the set of tokens assigned to the first node to completely account for the tokens related to the attribute assigned to nodes on the second tier.

17. The device of claim 14, where the instructions are further configured to cause the processor to:
access, at the data structure layer, an attribute database to determine the first attribute for the first node;
store an indicator of the first attribute within the memory; and
rewrite the data structure to associate the first node with the indicator of the first attribute.

18. A product comprising:
a machine-readable medium other than a transitory signal;
instructions stored on the machine-readable medium, the instructions configured to, when executed cause a processor to:
access, from configuration memory, a multiple-tier data structure at a data structure layer of a token apportionment stack to determine:
 a first node within a first tier of the multiple-tier data structure;
 a second node on a second tier of the multiple-tier data structure, the second tier below the first tier; and
 a first attribute that characterizes the first node;
at a token assignment layer of the token apportionment stack:
 receive, from the data structure layer, a data structure certificate message specifying the first node and the first attribute;

assign a set of tokens to the first node responsive to the first attribute;

after assigning the set of tokens to the first node, access an apportionment driver to determine an apportionment of the set of tokens for the second node;

recursively assign the apportionment of the set of tokens to the second node;

pass a token apportionment certificate message to a token apportionment data store in the data structure layer, the token apportionment certificate message comprising an indicator of the apportionment of the set of tokens assigned to the second node;

at an interface interaction layer of the token apportionment stack:

receive a query regarding apportionment of the set of tokens for the second node;

responsive to the query, access the token apportionment data store in the data structure layer; and generate a response to the query based on the apportionment of the set of tokens to the second node.

19. The product of claim 18, where the instructions are further configured to cause the processor to:

receive the response to the query at a tracking layer of the token apportionment stack; and update a time series database entry to reflect the response to the query.

20. The product of claim 18, where the instructions are further configured to cause the processor to:

access the configuration memory to determine a second attribute for the second node; and pass an indicator of the second attribute to the apportionment driver to alter a first apportionment tag for the second node.

* * * * *